(12) United States Patent
Layeghi (10) Patent No.: US 6,963,877 B2
(45) Date of Patent: Nov. 8, 2005

(54) SELECTIVE PROCESSING OF DATA EMBEDDED IN A MULTIMEDIA FILE

(75) Inventor: Shahab Layeghi, Redwood City, CA (US)

(73) Assignee: Intervideo, Inc., Fremont, CA (US)

( * ) Notice: Subject to any disclaimer, the term of this patent is extended or adjusted under 35 U.S.C. 154(b) by 648 days.

(21) Appl. No.: 09/884,504

(22) Filed: Jun. 14, 2001

(65) Prior Publication Data

US 2002/0019823 A1 Feb. 14, 2002

Related U.S. Application Data

(63) Continuation-in-part of application No. 09/790,032, filed on Feb. 20, 2001.
(60) Provisional application No. 60/183,765, filed on Feb. 18, 2000.

(51) Int. Cl.$^7$ ............................................. G06F 17/30
(52) U.S. Cl. ...................................... 707/102; 707/101
(58) Field of Search ........................... 707/1, 101, 102, 707/10, 104.1; 382/100; 455/186.1; 369/275.1, 275.3; 704/270, 500, 501, 504; 705/14, 27, 50; 709/217, 219, 231; 715/512; 725/136

(56) References Cited

U.S. PATENT DOCUMENTS

| | | | |
|---|---|---|---|
| 5,148,484 A | 9/1992 | Kane et al. ................. 704/214 |
| 5,465,403 A | * 11/1995 | Owaki ...................... 455/186.1 |
| 5,479,445 A | 12/1995 | Kloker et al. ............... 375/220 |
| 5,765,136 A | 6/1998 | Fukuchi ...................... 704/500 |
| 5,884,262 A | 3/1999 | Wise et al. ............... 704/270.1 |
| 6,006,241 A | * 12/1999 | Purnaveja et al. .......... 715/512 |
| 6,163,856 A | 12/2000 | Dion et al. ..................... 714/4 |
| 6,243,481 B1 | * 6/2001 | Tao ............................. 382/100 |
| 6,345,294 B1 | 2/2002 | O'Toole et al. ............. 709/222 |
| 6,363,384 B1 | 3/2002 | Cookmeyer, II et al. ..... 707/10 |
| 6,557,171 B1 | * 4/2003 | Sonoda et al. .............. 725/136 |
| 6,650,761 B1 | * 11/2003 | Rodriguez et al. .......... 382/100 |

OTHER PUBLICATIONS

Neil Strauss, "The MP3 Revolution: Getting with it", Jul. 18, 1999, The New York Times, pp. 1–6.*
Correia et al. "Active Video Watching using Annotation", Oct. 1999 ACM, pp. 151–154.*

* cited by examiner

*Primary Examiner*—Apu M. Mofiz
(74) *Attorney, Agent, or Firm*—Rosenberg, Klein & Lee (57) ABSTRACT

A method for encoding of media files to embed a data segment and time restriction information into the media file in order to restrict the time period when decoding and processing of the embedded data segment can be performed is described. The media file is capable of being decoded for playback as a media stream. It also includes a method for decoding the data segment as the encoded media file is reproduced as a media stream only during a specified time period as compared to the current time of day and/or date when the media stream is being played back. The restrictions preferably include a time tag specifying the start of a time period for reproducing the data segment or a time tag specifying the end of the time period, or both, in which case the time tags specify the start and end of the time period. The reproducing of the data segment includes subsequent processing for enabling the data to be displayed to a user. The method is capable of decoding previously encoded media files with embedded data for reproduction only during a predetermined time period specified by the corresponding time tags.

23 Claims, 4 Drawing Sheets

SELECTIVE PROCESSING OF DATA EMBEDDED IN A MULTIMEDIA FILE

CROSS REFERENCES TO RELATED APPLICATIONS

This application is a continuation-in-part of pending U.S. patent application Ser. No. 09/790,032 filed Feb. 20, 2001, entitled "Linking Internet Documents with Compressed Audio Files" which claimed the benefit of U.S. Provisional Application 60/183,765 filed Feb. 18, 2000.

FIELD OF THE INVENTION

The present invention generally relates to embedding data into a media file, and, more particularly, where time restriction information is included.

BACKGROUND OF THE INVENTION

The process of compressing an audio source, such as voice or music, and storing it digitally in a file is conventionally known. A user connected to the Internet can selectively download an encoded compressed file, such as a file in the MP3 format, run software to decode the file and thereby listen to the audio source. The MP3 format is well known in the art and refers to Layer 3 audio files of the Motion Picture Experts Group (MPEG) international standard for representation, compression, and decompression of motion pictures and associated audio on digital media. Conventionally, a decoder is employed to decode the encoded digital audio file.

A drawback of conventional methods is that compressed audio files do not include information and links to Internet documents that can be viewed during audio playback. Conventional methods require the listener of the decoded audio file to manually make any such links to Internet documents.

Methods are known for embedding data at a predetermined point in a media file, which may include, but is not limited to, an audio file. Such methods provide a means of permanently embedding data in a media file, extracting and displaying or further processing the embedded data on a suitable decoding system. For example, an Internet Uniform Resource Locator (URL) link to "www.intervideo.com/promotion.htm" can be embedded in a music file. Using these methods, whenever the music file is decoded and played, the corresponding decoder application can enable the web page corresponding to the embedded link to display a promotional message at a point in time during playback of the music file. For another example, a promotional message can be embedded in a music file such that when the music is decoded and played, the corresponding decoder application enables display of the message at a point in time in the middle of a particular song being played back. A drawback with these methods is that the embedded data permanently remains in the file and the decoder will always try to display the information. For the first above example, if the web page "promotion.htm" is removed from the web site "www.intervideo.com", the conventional decoder tries to load that page at a point in time during playback and will always display an error or a default message to indicate that the decoder could not find or display the information. For a further example, if the following text "Buy this CD now to get 50% discount" is embedded in a song to promote a limited duration discount offer, the text will be displayed every time the song is played back, even after the discount offer has expired.

One way to address the above drawbacks is to specify the offer duration in the message, for example, by changing the text to read "Buy this CD now to get 50% discount, offer expires on Jun. 25$^{th}$, 2001 at midnight". Even though this solves the ambiguity of offer duration, the message will still be displayed permanently at a point in time during playback even years after the offer has expired. Another approach is to remove the embedded data after a certain amount of time, but this entails altering the media file, which requires additional processing and may not be desirable or feasible. A similar problem exists when the intention is to display the information only after a certain date.

What is needed is a method whereby information embedded in a media file can be extracted only during a predetermined time duration.

SUMMARY OF THE INVENTION

The aforementioned drawbacks of known methods associated with permanently embedding data in a media file are overcome by the present invention. The present invention is directed to a method for encoding of media files to embed a data segment and time restriction information into the media file in order to restrict the time period when decoding and processing of the embedded data segment can be performed. The media file is capable of being decoded for playback as a media stream. The inventive method also includes a method for decoding the encoded media file such that the data segment is reproduced for playback as part of the media stream only during a specified time period as compared to the current time of day and/or date when the media stream is being played back.

In the preferred embodiment, to indicate a time restriction for the decoding of the data embedded in a media file, a method is provided to embed special time tags along with the embedded data segment to indicate a predetermined time when the data segment can be decoded and a predetermined stop time, after which time the data can no longer be extracted. The method for decoding includes reproducing the data segment at a specified point in the decoded media stream for playback only during the time period specified by the time tags. The reproducing of the embedded data segment preferably includes processing the embedded data segment to enable the embedded data segment or Internet linked web page or document, however, any suitable processing may be used.

In accordance with another aspect of the invention, a method is provided for decoding the encoded media file such that the data segment is reproduced for playback as part of the media stream only during a time period specified by one or more time tags embedded along with the data segment. Each time tag is compared to the current time of day and/or date when the media stream is being played back to determine if the data segment is to be reproduced for playback.

In one embodiment, the data segment is an address of an Internet document and is embedded along with the corresponding time restriction information into a media file. For this embodiment, during decoding the embedded Internet address is reproduced and processed for playback such that the web page or document corresponding to the Internet address is only displayed during a time period specified by the time restriction information as compared to the current time of day and/or date when the media stream is being played back.

For the present invention the media files may include, but are not limited to, audio files. Any suitable media files may be used, including MP3 files. The present invention is also not limited to the use of files, a suitable stream, not stored as a file, may be used. Preferably, the media file is compressed prior to the embedding of data and time restriction information, however, the present invention is not limited to use for embedding data and time restriction information into compressed media files, any suitable media file may be used.

In an encoder for encoding a media file so that it is capable of being decoded for playback as a media stream, the present invention is a method for encoding data and time restriction information with the media file such that when the encoded media file is decoded for playback as the media stream, the data is reproduced in the media stream only during a time period predetermined by the time restriction information, comprising the steps of: receiving a media file; receiving at least one data file comprising at least one data segment; receiving time restriction information for each data segment that specifies the time period when the data segment is to be reproduced as part of the decoded media stream; and embedding as part of the encoded media file each data segment and corresponding time restriction information such that the data segment is reproduced by a decoder during the specified time period.

DETAILED DESCRIPTION OF THE INVENTION

The present invention is directed to a method for encoding of media files to embed a data segment and time restriction information into the media file in order to restrict the time period when decoding and processing of the embedded data segment can be performed. In accordance with the present invention, a method is provided for specifying the time period determined by the time restriction information. The time restriction information comprises embedding with the corresponding data segment only a start time tag, embedding only a stop time tag, or embedding both a start time tag and a stop time tag. A start time tag specifies when the time period starts for reproducing the data segment. A stop time tag specifies when the time period for reproducing the data segment is to end. The data segment is no longer reproduced (e.g. including display to a user) after the stop time. The method of the present invention provides that both a start time tag and a stop time tag may be encoded along with the data segment in order to specify when the time period for reproducing the data segment is to begin and when the time period ends.

The "time" indication for the tags is not restricted to "time of day" but preferably indicates a date in a suitable date format. The present invention also provides for time tags that are a combination of date and time-of-day. For example, start time and stop time tags could be specified such that the start of the time period would be in a format of hours:minutes:seconds and the stop time would be a different hours:minutes:seconds such that the time period would be independent of month, day and year. Another example is a start time tag and stop time tag that each includes month, day, and year information such as where the time period starts at one specific date and ends at another specific date. For a further example, the start time tag and stop time tag both include hours:minutes:seconds and month-day-year restrictions. The time tags are not limited to the above examples, any suitable set of time period restrictions can be used.

The data segment and media file are not limited to files, suitable data streams may also be used. The media file is preferably compressed. The present invention is not limited to use with compressed media files, however, any suitable uncompressed media file may be used.

Figure 1:
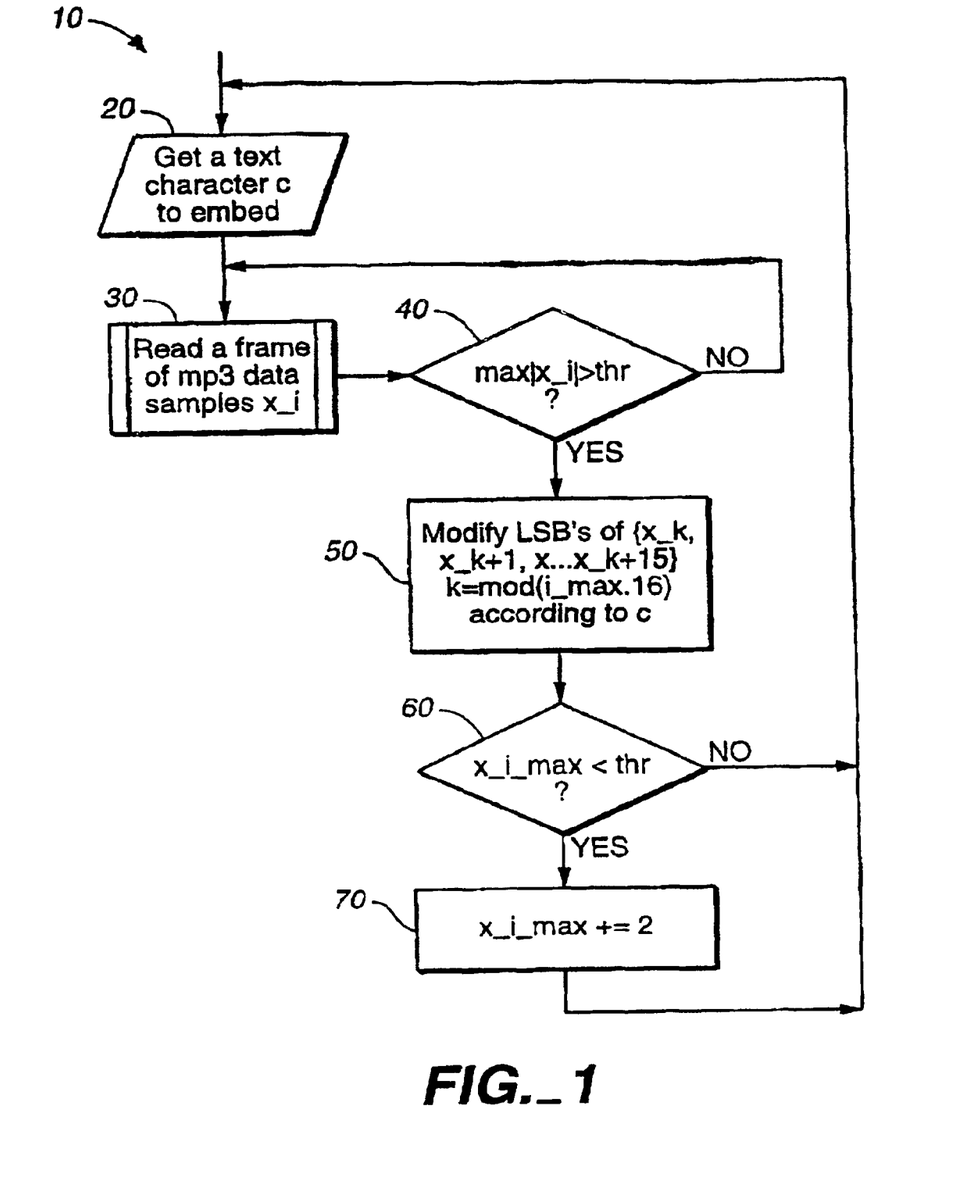
FIG. 1 illustrates the process steps of an encoder method or algorithm according to an exemplary embodiment of the present invention.

For the preferred embodiment of the inventive method of the present invention the method of encoding is in a encoder which is for encoding a media file so that it is capable of being decoded for playback as a media stream. FIG. 1 illustrates the process steps of an encoder method or algorithm 10 according to an exemplary embodiment of the present invention. In one exemplary aspect, to link documents (i.e. Internet documents) with compressed audio files such as ".MP3" files, the addresses of the Internet documents along with the corresponding "point in time" information are embedded into the compressed files. The point in time information specifies the point within the media stream when the embedded data Internet document, or other displayable information, should be reproduced when the media file is played back by a decoder. In the case of compressed audio files, when the encoded file is played back in a decoder which is aware (i.e. can detect) of such an encoding scheme, it extracts the embedded information while decompressing the audio information and uses the embedded information to reference the documents on the Internet.

An example of the data that can be embedded in a media file according to this aspect of the present invention is as follows:

```
{
1.0: www.intervideo.com
10.2: www.intervideo.com/mymusic/info1.htm
}
```

The number on the left indicates the timing information. For use with compressed audio files, an audio compressor unit of the encoder uses these timing values to embed the corresponding information at the specified point in time. The decoder extracts this information and executes a proper action. The embedded information may also represent displayable information that can be displayed. The information can be a web page link such that the decoder can open the corresponding web page or web command at the specified times. In another aspect, the encoder embeds the point in time information along with the corresponding data. The method can be performed in various systems including a computer system or other device that includes a central processing unit and a display. Preferably, the system has the capability to connect to the Internet.

For the method or algorithm 10 in FIG. 1, at Step 20 the encoding process begins and during this step the decoder gets a piece of information (e.g. a text character "c") to embed. The information is shown as text character information, however, any information the decoder can display or otherwise process can be embedded. In Step 30 the encoder reads a block of audio data samples, shown as $x\_i$. For the example in FIG. 1, the data samples can be frequency domain MP3 compressed audio samples. Step 30 also shows, as an example, the reading of a frame. It is well known in the art that an MP3 bitstream comprises frames of compressed data. It is also known there may be more than one audio channel, e.g. stereo, with each channel storing independent samples. The algorithm shown in FIG. 1 can also be applied to embed different information in each channel. At Step 40, the encoder determines whether the maximum value of the audio sample in the block exceeds a threshold value. The threshold value has been determined to be a value below which the embedding of data would unacceptably degrade the audio quality for a user during playback. If the threshold value has not been exceeded by the maximum value, then the method jumps back to Step 30. If the threshold has been exceeded, then in Step 50 the encoder modifies the least significant bits (LSB's) of a subset of said block, wherein a digital representation of the information (shown as exemplary text character "c" in FIG. 1) is encoded. Preferably, the subset is a block of 16 samples, as shown in Step 50 $\{x\_k$ through $x\_k+15\}$; where k=mod (i_max,16). In Step 60, a determination is made as to whether the maximum of the modified block samples (shown as $x\_i\_max$) exceeds the threshold, shown as "thr". If the threshold is exceeded, embedding has been successful and there is a branch to Step 20. If the threshold is not exceeded then two is added to the digital value of the modified sample to exceed said threshold. The value two is chosen because it is the smallest value that can be added to a number without changing the least significant bit of the binary representation. The current invention is not limited to this value, however. Then the process returns to Step 20 for the encoding of the next character.

Figure 2:
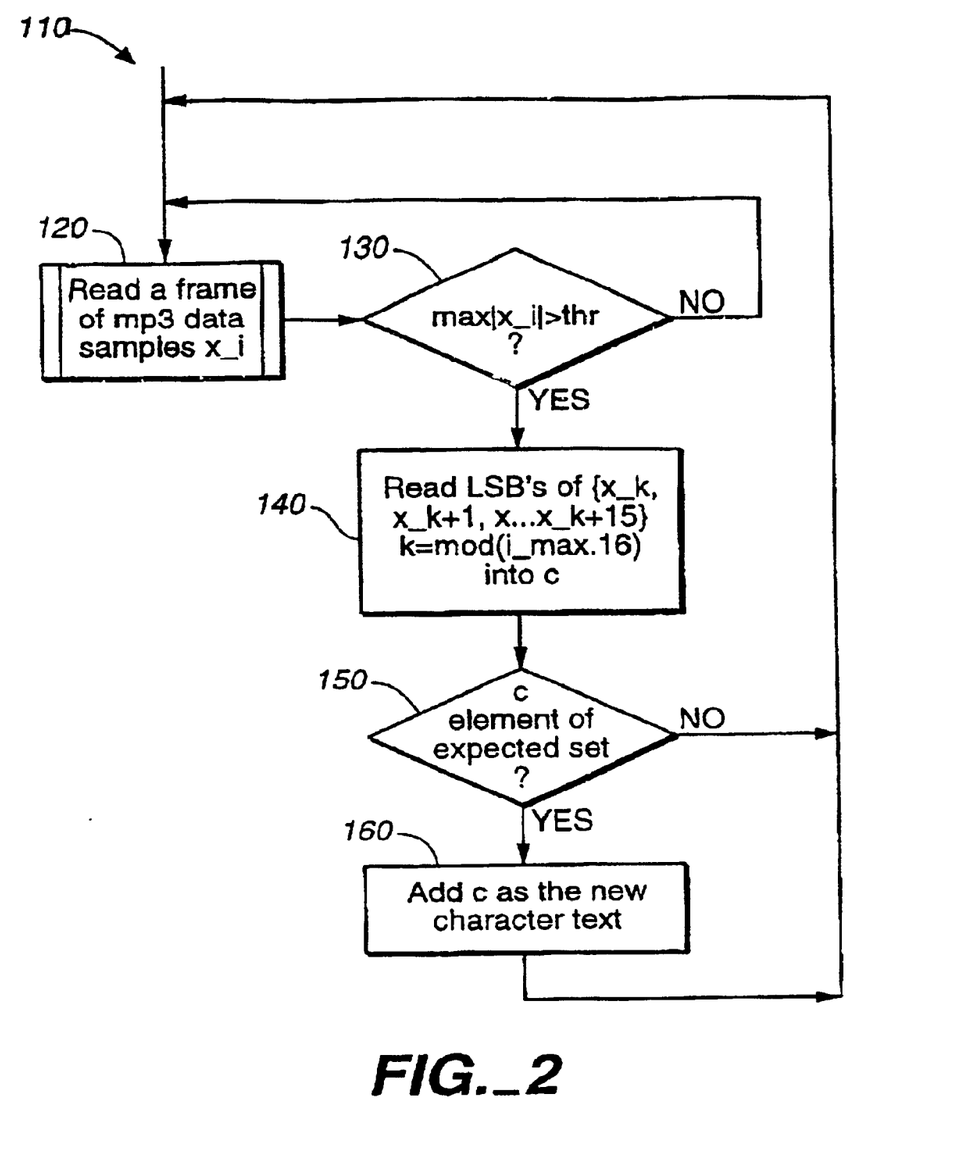
FIG. 2 is a flow chart illustrating the process steps of an decoder method or algorithm according to an exemplary embodiment of the present invention.

For the preferred embodiment of the inventive method of the present invention the method of decoding is in a decoder which is for decoding an encoded media file for playback as a media stream. FIG. 2 is a flow chart illustrating the process steps of a decoder method or algorithm 110 according to an exemplary embodiment of the present invention. According to this method, what is decoded is information (shown as text character "c" for the exemplary algorithm) that was previously encoded as specified in the encoding method shown in FIG. 1. As seen in FIG. 2, in Step 120 the decoder reads a block of encoded audio data samples. At Step 130, a determination is made as to whether the maximum value of the encoded audio sample in the block exceeds a threshold value. If it is above the threshold, this indicates that no text characters were embedded. If the threshold is not exceeded, then the process returns to Step 120. If the threshold is exceeded, then Step 140 is performed wherein the decoder reads the least significant bits (LSB's) of a subset of the encoded block, wherein a digital data code is decoded. In Step 150, the decoder determines whether the decoded digital data code represents valid information (shown as "c" for the exemplary algorithm) wherein the decoded information is found in an expected set. An ASCII character set is an example of an expected set. An expected set can be chosen in a manner suitable for the desired application. It is also possible that some applications do not require limiting the embedded information to an expected set. The present invention is not limited to ASCII characters, for example. If the decoded information is not in the expected set, then the process proceeds back to Step 120. If the decoded information is in the expected set, then Step 160 is performed wherein the decoded valid information (e.g. exemplary character "c" in Step 160) is added as a new character (e.g. to an existing string), and the process then proceeds back to Step 120.

The drawbacks of known methods associated with permanently embedding the data in a media file are overcome by the present invention. In the preferred embodiment, a method is provided to encode time restriction information along with each corresponding data segment embedded in a media file in order to specify a time period such that the data segment is reproduced by a decoder at a specified point in the media file only during the time period determined by the time restriction information. The data segment is preferably part of a data file. The time restriction information is comprised of one or more time tags in order to specify the proper time period to reproduce the data segment embedded in the media file. The reproducing of the data segment preferably includes subsequent processing for enabling the data to be displayed to a user. The present invention is not limited to such processing however, any suitable processing can be performed.

For the preferred embodiment of the present invention, during encoding of a media file to embed data, two checks are done before each data segment is embedded. According to one preferred encoding method, a first check is made to determine if the data segment is to have a "start time" associated with it. A further check is made to determine if the data segment is to have a "stop time" associated with it. These checks could be done by either interactively prompting the file creator or through pre-programming a special script file. If the data segment is to be reproduced for a limited time period, then during the encoding process one or more corresponding time tags are embedded along with the data for that segment. Preferably, the time tags are encoded such that the tags include a unique identifier to specify the tag type (start or stop) and a "time" field that specifies the time to start or stop presenting the data. As shown in the above examples, the "time" field can comprise both date and time information. The preferred embodiment of the present invention will now be described in detail with reference to FIGS. 3 and 4.

Figure 3:
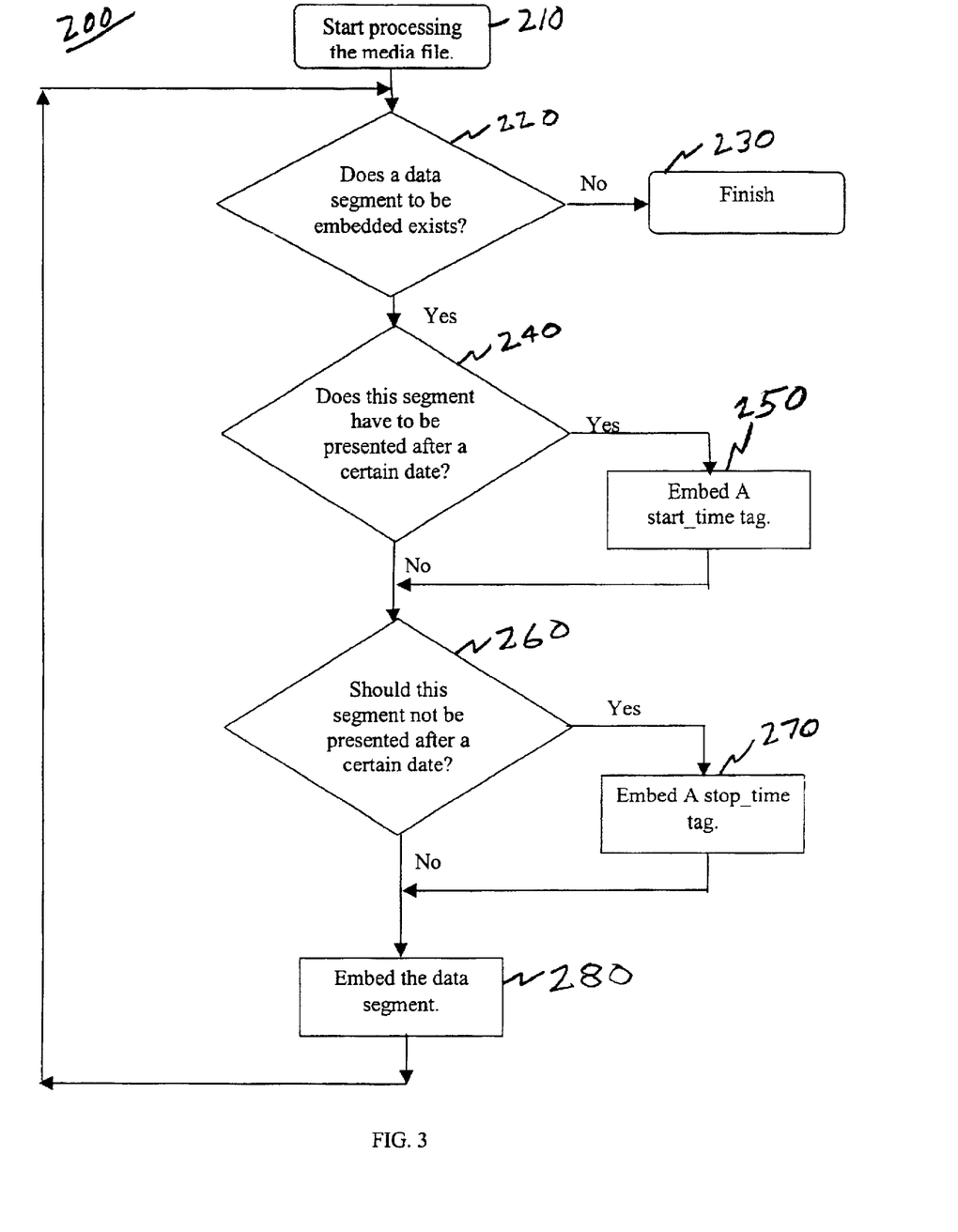
FIG. 3 is a flow chart illustrating an exemplary embodiment of the process steps of the encoder method that enables selective presentation time tagging according to a preferred embodiment the present invention.

FIG. 3 is a flow chart illustrating exemplary process steps of the encoder algorithm 200 for the encoding of media files to embed a data segment and time restriction information into the media file in order to restrict the time period when decoding and processing of the embedded data segment can be performed. The encoding method enables selective presentation time tagging according to a preferred embodiment of the present invention. In Step 210 of FIG. 3, the encoding algorithm begins encoding of a media file. In step 220, a determination is made as to whether there is a data segment to be embedded in the media file. If there is no data segment to embed, the encoding algorithm proceeds to finish at Step 230. If a data segment to be embedded does exist, then Step 240 is executed. The method in FIG. 3 then determines whether to embed time restriction information that specifies the time period when the data segment is to be reproduced as part of a decoded media stream.

At Step 240, a check is made as to whether the data segment has to be reproduced (e.g. presented) only after a certain "date" where "presented" refers to enabling the data to be displayed to a user for the preferred embodiment. For the preferred embodiment in FIG. 3, a certain "date" is shown in the exemplary embodiment in the algorithm. For the present invention the "date" is not limited to a calendar date, however. Any suitable time-of-day or combination of time-of-day and date can be used for the time restriction information. If in Step 240 it is determined that the data segment is to be presented after a certain date, then the encoding algorithm proceeds to Step 250. In Step 250, for the media file a corresponding start_time tag is embedded with the data segment as part of the media file and then Step 260 is executed. The start_time tag specifies when the time period starts for reproducing the data segment. If in Step 240 is it determined that the data segment is not limited to only being presented after a certain date, then the algorithm Step 260 is executed.

In Step 260, a determination is made as to whether the data segment should not be presented after a certain date. If the data segment should not be presented after a certain date (e.g. the time period ends at a certain date), then Step 270 is executed. In Step 270 a stop_time tag is embedded in the media file, and the algorithm proceeds to Step 280. A stop time tag specifies when the time period for reproducing the data segment is to end. As seen in FIG. 3, the method provides that both a start_time tag and a stop_time tag may be encoded along with the data segment in order to specify when the time period for reproducing the data segment is to begin and when the time period ends. If in Step 260 it is determined that there is not a restriction specifying that the data segment should not be presented after a certain date, then Step 280 is executed. In Step 280, the data segment is embedded as part of the media file, and the algorithm proceeds back to Step 220 to check for more data segments.

Figure 4:
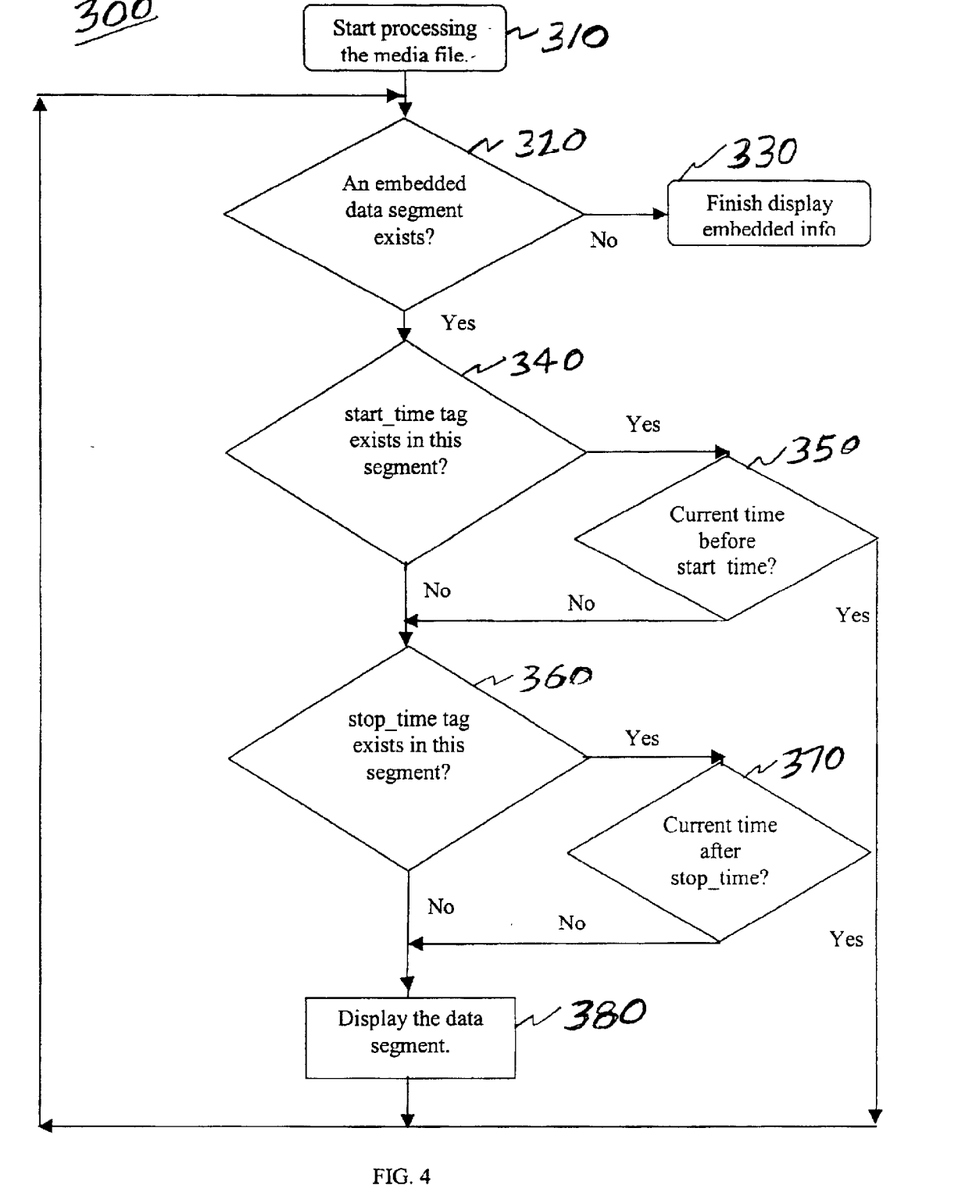
FIG. 4 is a flow chart flow chart illustrating an exemplary embodiment of the process steps of the decoder method that enables selective presentation time tagging according to a preferred embodiment of the present invention.

The inventive method also includes a method for decoding the data segment as the encoded media file is reproduced as a media stream only during a specified time period as compared to the current time of day and/or date when the media stream is being played back. FIG. 4 is a flow chart illustrating the process steps of a preferred embodiment of the method or algorithm for decoding for the present inventive method that enables selective presentation time tagging. The decoder algorithm 300 begins at Step 310 for processing of the encoded media file. In Step 320 a determination is made as to whether an embedded data segment exists in the encoded media file. If there is not an embedded data segment, then the method proceeds to Step 330 to finish display of embedded information. If in Step 320 it is determined that an embedded data segment does exist in the encoded media file, then Step 340 is executed. In Step 340 a determination is made as to whether a start_time tag exists in the data segment such that the data segment is only to be reproduced for a time period starting at the specified start time of the start_time tag. If the start_time tag exists in the data segment, Step 350 is executed. In step 350, the decoding algorithm obtains the current time and determines whether a current time is before the specified start_time in the start_time tag. If the current time is before the start time, the method loops back to Step 320. If the current time is not before the start time, then Step 360 is executed. Also, if at step 340 a start_time tag does not exist then Step 360 is executed.

As shown in FIG. 4, at Step 360 a determination is made as to whether a stop_time tag_exists in the data segment such that the data segment is only to be reproduced for a time period ending at the specified stop time of the stop_time tag. If a stop_time tag exists, then the algorithm proceeds to Step 370. In Step 370, a determination is made as to whether the current time is after the stop_time tag. If the current time is after the stop_time tag, then the algorithm loops back to Step 320. If the current time is not after the stop time in the stop_time tag then Step 380 is executed. If it is determined in Step 360 that a stop_time tag does not exist, then Step 380 is executed. In Step 380 the data segment is reproduced (e.g. displayed in the exemplary embodiment in FIG. 4) and then the method loops back to execute Step 320 for the next data segment. Preferably, the reproducing of the data segment includes subsequent processing for enabling the data to be displayed to a user. However, any suitable processing may be performed.

For the exemplary embodiment shown in FIG. 4, the "time" is referred to in the algorithm, however, for the invention the "time" is not limited to a clock time, a suitable time, day or time and date representation can also be used. The current "time" shown in FIG. 4 may include time of day and date information obtained by the decoding method through suitable means, the details of which are well known in the art and beyond the scope of this description.

In another embodiment, one or more time tags are embedded with the data segment in the encoded media file but the current time is not available for comparison purposes when the media stream is being played back during decoding. When the current time is not available for comparison; the decision as to whether or not the embedded data segment is reproduced can be made by a user of the inventive method. Alternatively, whether the data segment is to be reproduced or not reproduced when the current time is not available can be predetermined (e.g. by the data segment or media file creator).

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. In an encoder for encoding a media file so that it is capable of being decoded for playback as a media stream, a computer-implemented method for encoding data and time restriction information with said media file such that when said encoded media file is decoded for playback as said media stream, said data is reproduced in said media stream only during a time period predetermined by said time restriction information, comprising the steps of:
   (1) receiving a media file;
   (2) receiving at least one data file comprising at least one data segment;
   (3) receiving time restriction information for each said data segment that specifies said time period, such that said data segment can be reproduced as part of said decoded media stream only if said time period corresponds to the current time and/or date when said media stream is being played back; and
   (4) selectively modifying part of said encoded media file to embed each said data segment and said corresponding time restriction information.

2. The method of claim 1, wherein said time restriction information comprises a start time tag that specifies when said time period is to begin.

3. The method of claim 1, wherein said time restriction information comprises a stop time tag that specifies when said time period is to end.

4. The method of claim 1, wherein said time restriction information comprises a start time tag that specifies when said time period is to begin and a stop time tag that specifies when said time period is to end.

5. The method of claim 1, wherein the embedding in step (4) is such that said data is reproduced at a specified point in said media stream.

6. The method of claim 1, wherein said data segment comprises a document file.

7. The method of claim 1, wherein said data segment comprises an Internet address.

8. The method of claim 1, wherein said media file is an audio file and said data segment is a non-audio data segment.

9. The method of claim 8, wherein said audio file is an MP3 file.

10. In an encoder for encoding a media file so that it is capable of being decoded for playback as a media stream, a computer-implemented method for encoding a data segment and time restriction information for said segment with said media file such that when said encoded media file is decoded for playback as said media stream, said data segment is reproduced at a specified point in said media stream only during a time period predetermined by said time restriction information, comprising the steps of:
   (a) receiving a media file;
   (b) receiving a segment of data embedded in a selectively modified part of said media file;
   (c) receiving the specifics of said time period when said data segment can be reproduced as part of said decoded media stream only if said time period corresponds to the current time and/or date when said media stream is being played back, including one of the following:
      i) a start time,
      ii) a stop time,
      iii) both a start and a stop time.

11. The method of claim 10, wherein said media file is an audio file and said data segment is a non-audio data segment.

12. In a decoder for decoding an encoded media file for playback as a media stream, a computer-implemented method for decoding data and time restriction information from an encoded media file, comprising the steps of:
   (1) receiving a block of said encoded media file;
   (2) decoding a data segment embedded within said block;
   (3) decoding said time restriction information embedded in a selectively modified part of said block for said data segment, wherein said time restriction information specifies a time period when said data segment is to be reproduced as part of said decoded media stream;
   (4) comparing said specified time period to the current time of day and/or date when said media stream is being played back; and
   (5) responsive to said comparison, reproducing said data segment at a specified point in said decoded media stream for playback only during said specified time period.

13. The method of claim 12, wherein said reproducing of said data segment includes subsequent processing for enabling the data to be displayed to a user.

14. In a decoder for decoding an encoded media file for playback as a media stream, a computer-implemented method for decoding an embedded data segment and time restriction information from said encoded media file wherein said embedded data segment is to be reproduced at a specified point in said media stream only during a time period predetermined by said time restriction information, comprising the steps of:
   (a) reading a block of said encoded media file;
   (b) determining whether said embedded data segment exists within a selectively modified part of said block;
   (c) if said embedded data segment does not exist within said block, then proceeding to step (p);
   (d) determining whether a start time tag exists in said embedded segment that specifies when said time period is to begin;
   (e) if said start time tag does not exist, then proceeding to step k);
   (f) determining the start time specified by said start time tag;
   (g) getting the current time of day and/or date when said media stream is being played back;
   (h) comparing said start time to the current time;
   (i) if the current time is before said start time then proceeding to step (p);
   (j) determining whether a stop time tag exists in said embedded data segment that specifies when said time period is to end;
   (k) if said stop time tag does not exist, then proceeding to step (o);
   (l) determining the stop time specified in said stop time tag;
   (m) comparing said stop time tag to the current time;
   (n) if the current time is after said stop time then proceeding to step (p);
   (o) reproducing said embedded segment; and
   (p) Continuing to step (a).

15. The method of claim 14 wherein said media file is an audio file and said embedded data segment is a non-audio data segment.

16. The method of claim 14 wherein step (g) further includes the step of proceeding to step (o) if no current time is available.

17. The method of claim 16 wherein step (o) further includes the step of determining whether said embedded segment is reproduced based on input from a user.

18. The method of claim 14 wherein step (g) further includes the step of proceeding to step (p) if no current time is available.

19. The method of claim 14, wherein the reproducing of said embedded data segment in step (o) includes subsequent processing for enabling the data to be displayed to a user.

20. The method of claim 19, wherein said embedded data segment is an Internet address.

21. The method of claim 20, wherein said processing includes linking to an Internet document determined by said Internet address.

22. A computer-implemented system for encoding data and time restriction information with a media file and for the later decoding of said encoded media file such that when said encoded media file is decoded for playback as a media stream, said data is reproduced in said media stream only during a time period predetermined by said time restriction information, comprising:
   an encoder operative to receive said media file, at least one data file comprising at least one data segment, and time restriction information for each said data segment and operative to selectively modify a part of said media file to embed said data segment and said corresponding time restriction information; and
   a decoder operative to separate said encoded media file into said decoded media stream, said data segment and said time restriction information, operative to compare said specified time period to the current time of day and/or date when said media stream is being played back, and operative in response to said comparison to playback said data segment as part of said decoded media stream only during said time period specified by said corresponding time restriction information.

23. A computer-implemented method for encoding and thereafter decoding a media file such that a data segment embedded in said media file after encoding is reproduced during decoding at a specified point during a predetermined time period for playback as a media stream for a user, comprising the steps of:

(1) receiving a media file;

(2) receiving at least one data file comprising at least one data segment;

(3) receiving time restriction information for each said data segment that specifies said time period when said data segment is to be reproduced as part of said decoded media stream; and (4) selectively modifying a part of said encoded media file to embed each said data segment and said corresponding time restriction information such that said data segment is reproduced by a decoder during said specified time period;

(5) receiving a block of said encoded media file;

(6) decoding said data segment embedded within said block;

(7) decoding said time restriction information embedded within said block for said data segment, wherein said time restriction information specifies a time period when said data segment is to be reproduced as part of said decoded media stream;

(8) comparing said specified time period to the current time of day and/or date when said media stream is being played back; and (9) responsive to said comparison, reproducing said data segment at a specified point in said decoded media stream for playback only during said specified time period.

* * * * *